July 5, 1932. L. A. GEBHARD 1,866,459
TRANSMITTING SYSTEM
Filed Dec. 22, 1928 2 Sheets-Sheet 1
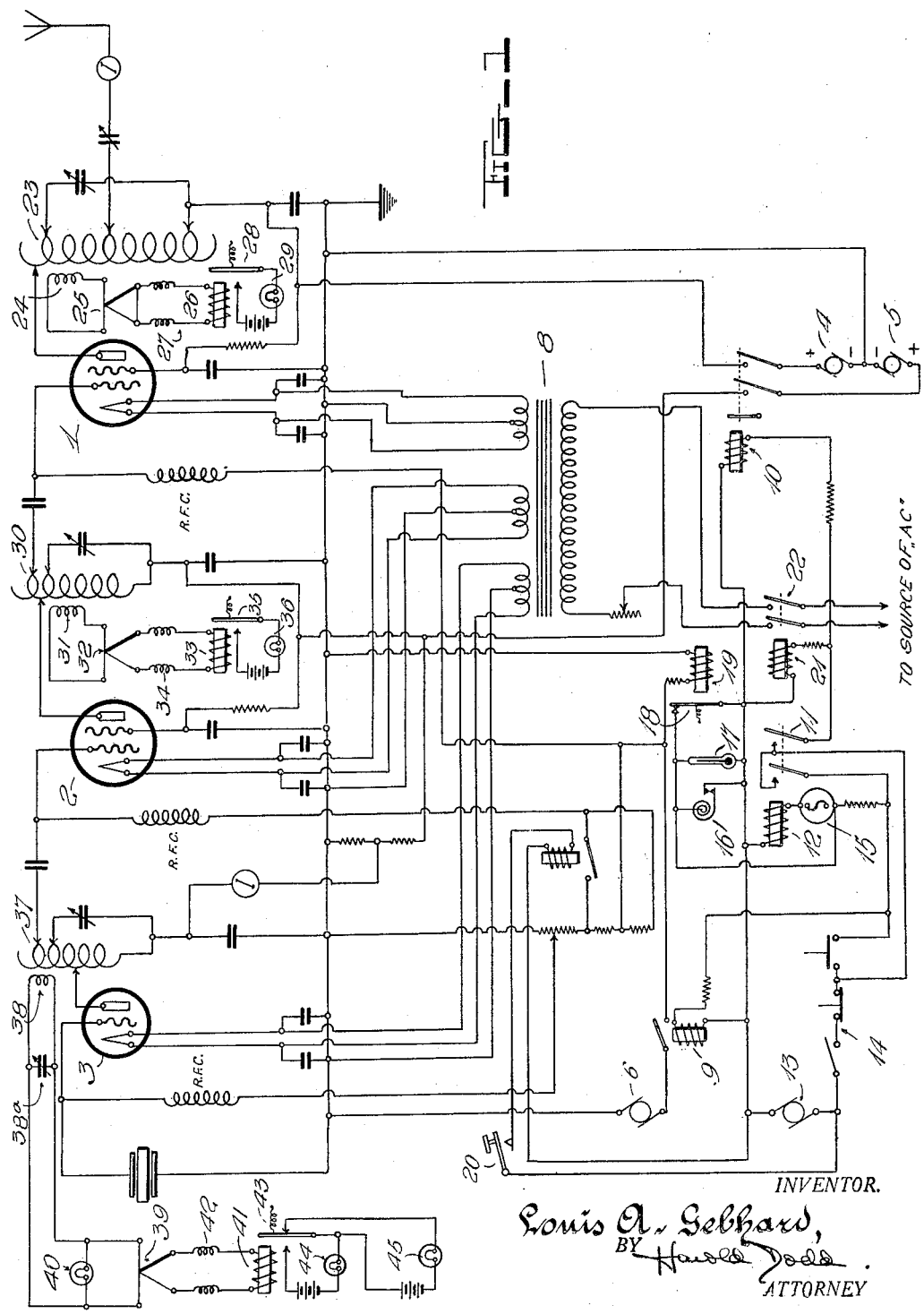
INVENTOR.
Louis A. Gebhard,
BY Harold Dods
ATTORNEY

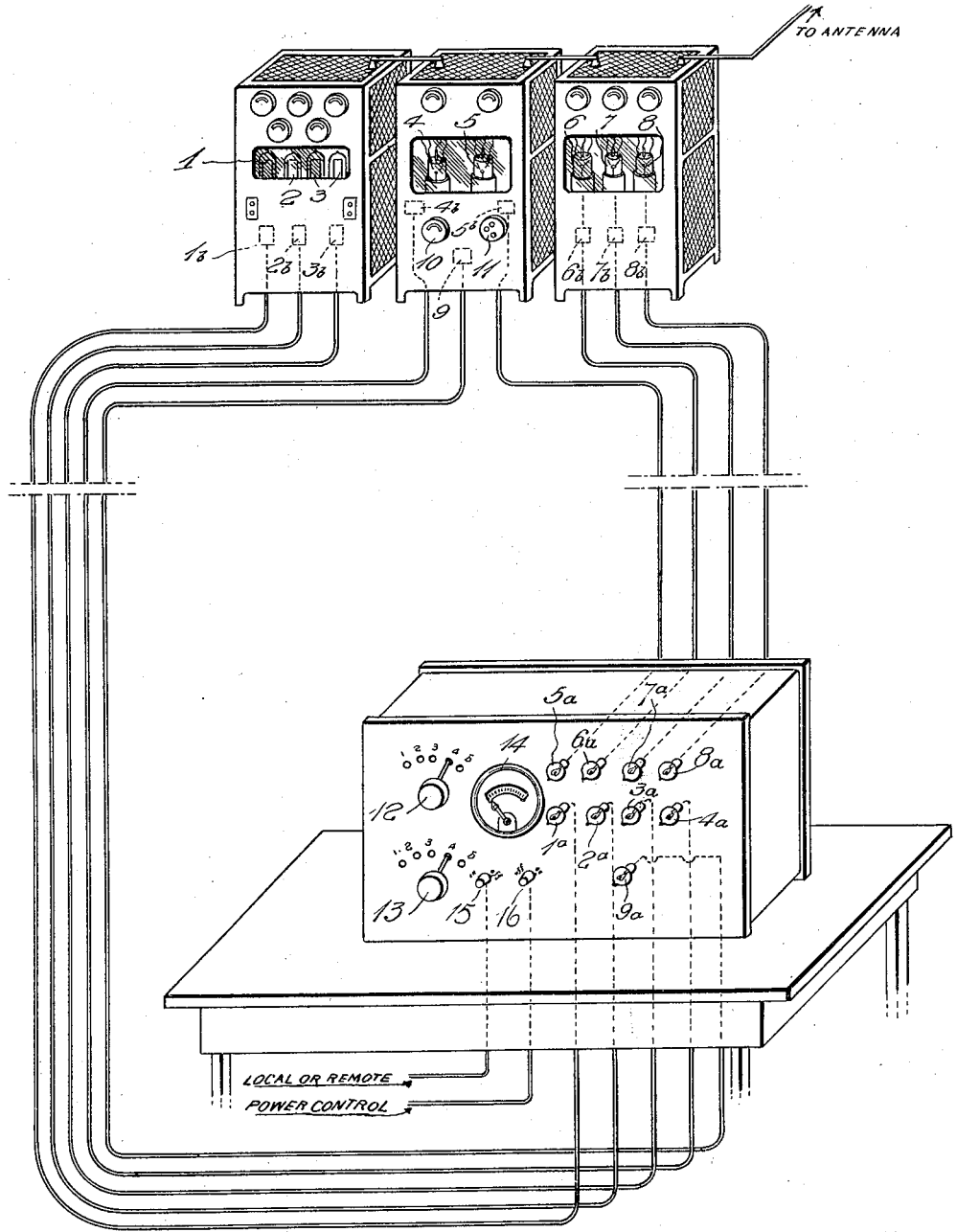

Patented July 5, 1932

1,866,459

UNITED STATES PATENT OFFICE

LOUIS A. GEBHARD, OF WASHINGTON, DISTRICT OF COLUMBIA, ASSIGNOR, BY MESNE ASSIGNMENTS, TO WIRED RADIO, INC., OF NEW YORK, N. Y., A CORPORATION OF DELAWARE

TRANSMITTING SYSTEM

Application filed December 22, 1928. Serial No. 327,981.

My invention relates to transmitting systems in general and more specifically to indicating and warning systems employed therewith.

An object of my invention is to provide a transmitting system whereby the operation or failure of operation in any part thereof is indicated to the attending operator.

Another object of my invention is to provide a warning signal in combination with a thermionic tube transmitter whereby the inoperation of any part of the high frequency circuits is readily indicated.

Still another object of my invention is to provide a warning signal employed in combination with a thermionic tube transmitter wherein the anodes of the respective tubes are cooled by a circulatory liquid and whereby the signal is energized only when the control electrode biasing potential is supplied to the thermionic tubes and the circulatory liquid is of the proper pressure and temperature.

A further object of my invention is to provide an indicating system adapted to indicate to the attending operator the failure of any or all of the radio frequency circuits or an increase or decrease in the high frequency energy in the several circuits.

A better understanding can be had of the system I employ by referring to the specification following and to the accompanying drawings wherein Figure 1 shows the improvements in transmitting systems of my invention and Fig. 2 is a diagrammatic illustration showing the warning and indicating system associated with the transmitter proper.

In transmitting systems employing thermionic tubes in high frequency circuits, it is necessary that the circuits be adjusted to the proper frequency values. When several thermionic tubes are employed in circuits for the generation and amplification of high frequency signaling energy, either of the circuits having frequency characteristics other than that of the other or a harmonic frequency thereof, causes a lowering of the output energy and thus a great loss in efficiency. If for any reason one of the several high frequency circuits is not operating properly such as caused by a defective thermionic tube, the efficiency of the transmitting system is greatly reduced. If, on the other hand, one of the several thermionic tube circuits is operating above that normally observed, it is likely that some thermionic tube or its associated circuit is defective. Heretofore in the art, it has been customary to employ warning signals in the power supply circuits to the several thermionic tubes. This method is suitable in some instances but does not indicate the output energy or failure of high frequency energy in the several high frequency circuits. In the improvements in transmitting systems of my invention the attending operator is warned when either of the several thermionic tube circuits is not operating, when the high frequency energy in either of the high frequency circuits is of too high a value or when the high frequency energy in either of the circuits is of too low a value. In the transmitting system of my invention the attending operator is warned when either of the several high frequency circuits are out of adjustment and further provides an accurate indication to the attending operator as to the particular circuit or part of the transmitter which is not operating in the manner intended. This greatly increases the efficiency of the transmitter inasmuch as the trouble may be readily located and the necessary adjustments or repairs made without the customary over-all inspection of the system.

Fig. 1 of the accompanying drawings is a schematic circuit arrangement showing the improvements in transmitting systems of my invention. Thermionic tubes 1 and 2 are employed in suitable amplifier circuit arrangements whereby the high frequency energy from the circuits of thermionic tube 3 is amplified. The anode circuits of thermionic tubes 1, 2 and 3 are energized from sources 4 and 5 respectively. The control electrode biasing potential is supplied the control electrodes of thermionic tubes 1, 2 and 3 from source 6. The energy supply to the cathodes of thermionic tubes 1, 2 and 3 is by means of transformer 8. It is necessary that the contact members associated with the armature of relay 9 be closed before the control electrode biasing potential is supplied thermionic tubes 1, 2 and 3. It is likewise necessary that electromagnetic circuit breaker 10 be energized to actuate the armature associated therewith and complete the supply of energy to the respective anodes of thermionic tubes 1, 2 and 3. The supply of energy to transformer 8 and hence to the cathodes of the thermionic tubes depends upon the closing of contact members 22 which is accomplished by the energization of electromagnetic relay 21. The energization of electromagnetic relay 21 depends upon the closing of contact members 11 which in turn depends upon the energization of electromagnetic relay 12. Electromagnetic relay 12 is energized from source 13 by means of momentary contact switch 14. Indicating device 15, which may be any suitable alarm, is energized simultaneously with the energization of electromagnetic relay 12 and indicates to the attending operator that the several relay circuits are energized. Indicating device 15 is also controlled by pressure gauge 16, temperature gauge 17 and contacts 18. Contacts 18 are controlled by electromagnet 19 which in turn is energized by source of grid biasing potential 6. The contact members associated with pressure gauge 16 are closed when the transmitting set is closed down. Likewise contact members 18 associated with electromagnet 21 are closed. When momentary contact switch 14 is closed, relay 9 is energized which latter completes the circuit for energizing electromagnet 19. The control electrode biasing potential is supplied thermionic tubes 1, 2 and 3 only when electromagnet 19 is energized. Since the opening of contact members 18 and the opening of the contact members associated with pressure gauge 16 is necessary for the energization of electromagnet 12, it also follows that these contact members must be opened before indicating signal 15 is energized. By such an arrangement it is obvious that it is impossible to cause the energization of the respective anode circuits without the supply of control electrode biasing potential being first supplied to the tubes and when the control electrode biasing potential is supplied to the tubes signal 15 will be energized as will also electromagnet 12. Should the control electrode biasing potential fail, as is likely to happen, the anode supply potential is automatically removed. This is because of the deenergization of electromagnet 19 and the closing of contact members 18. Should the temperature of the circulating liquid be too high, signal 15 is deenergized as is also electromagnet 12. Signal 15 may be mounted in any convenient position whereby the attending operator would be warned. Electromagnetic relay 19 may be mounted as near as possible to the control electrodes of the tubes and individual relays connected in series or parallel may be employed with the several thermionic tubes. In high frequency transmitting systems employing a supply of control electrode biasing potential derived from thermionic tube rectifiers, it is not unusual that one of these rectifier tubes becomes inoperative thereby causing a lower value of biasing potential or an absence of biasing potential supplied the several thermionic tubes. This results in an excessive anode current which causes the thermionic tube to be destroyed or its operation materially impaired. In the transmitting system of my invention the anode potential would automatically be removed upon the failure of the control electrode biasing potential. Ordinary over-load circuit breakers are generally employed for this purpose, however, it is obvious that the principle upon which they operate, that of increased current, causes damage to the very tube which is meant to be protected by this temporary overload to which the tube is subjected.

A further protective device and warning system employed in the transmitting system of my invention provides means for maintaining the high frequency energy in the several circuits of the proper value. In Fig. 1 of the accompanying drawings the system is schematically shown employed in combination with the high frequency circuits of thermionic tubes 1, 2 and 3. The high frequency circuit of thermionic tube 1 includes inductance 23. Inductance 23 is associated with inductance 24 and adapted to transfer high frequency energy thereto. Inductance 24 is associated with thermo-couple 25. Thermo-couple 25 is adapted to deliver energy to electromagnet 26 by way of high frequency choke coils 27. High frequency choke coils 27 prevent the high frequency energy from causing damage to the winding of electromagnet 26. Armature 28, provided with suitable contacting members, is electromagnetically associated with electromagnet 26. The contact members associated with armature 28 are adapted to control any suitable alarm or indicating circuit 29. The frequency characteristics of inductance 24 may be substantially aperiodic or may be periodic by employing an inductance of proper design or by employing a capacity connected therewith. In the latter instance, where the frequency characteristics are sharply defined, it is obvious that energy of appreciable value would energize electromagnet 26 when and only when the circuit including inductance 24 was adjusted to a frequency corresponding approximately to that of the high frequency energy in inductance 23. An increase or decrease in the frequency of the energy would be indicated by indicating signal 29. Any number of thermionic tubes may be employed and a similar indicating system associated therewith. Similarly to the above mentioned indication of a change in the frequency of the high frequency energy, a change in the value of such energy could be indicated. A similar indicating system is shown associated with inductance 30. Inductance 30 may have frequency characteristics corresponding to those of inductance 23 or may have frequency characteristics corresponding to one-half or one-third the frequency of the latter circuit. It is frequently the practice to employ several amplifiers operating on a fundamental frequency and one or more multiple frequencies thereof. Inductance 31 may have substantially periodic frequency characteristics for the frequency desired. Inductance 31 is associated with thermo couple 32 and the latter associated with electromagnet 33 by means of high frequency choke coils 34. Armature 35 is actuated by electromagnet 33 and is adapted to control indicating circuit 36.

In transmitting systems employing a mechanically vibratile element such as a quartz crystal having piezo electric properties, it is necessary to safeguard the crystal by not subjecting the same to an overload. An indicating system suitable to warn the attending operator when such a condition arises, is schematically illustrated in combination with thermionic tube 3 of Fig. 1. Inductance 38 is associated with inductance 37, the latter comprising a portion of the high frequency circuit. The frequency characteristics of inductance 38 may be substantially periodic by employing a suitable capacity 38a connected therewith. Inductance 38 is associated with thermo-couple 39 and the latter associated with electromagnet 41 by means of suitable high frequency choke coils 42. Armature 43 is electromagnetically associated with electromagnet 41 and is actuated thereby. Suitable contacted members are associatively related to armature 43 whereby individual indicating circuits 44 and 45 are controlled by the actuation of armature 43. Armature 43 may be adjusted in such a manner than an increase of current in electromagnet 41 causes the energization of indicating circuit 44 and whereby a decrease in such current causes the energization of indicating circuit 45 or vice-versa. A suitable lamp or indicating device 40 may be directly associated with inductance 38 whereby the presence of any high frequency energy will be indicated. In operation, inductance and capacity circuit 38—38a may be adjusted to a frequency value approximately that of the high frequency energy. Sufficient energy should be present in electromagnet 41 whereby indicating circuit 45 would be de-energized. If the frequency of the high frequency energy would change to a value more closely corresponding to the frequency characteristics of circuit 38—38a, a greater amount of energy would energize electromagnet 41. This would cause armature 43 to complete the energization of indicating circuit 44. Indicating circuits 44 and 45 thereby indicate to the attending operator the approximate operational conditions of thermionic tube 3 and the associated high frequency circuits. Should the frequency of the signaling energy increase in value one of the indicating circuits is energized. Should the frequency of the signaling energy decrease in value the other indicating circuit is energized. When the frequency of the signaling energy is neither greater than nor less than the desired frequency, neither indicating circuit is energized. Should the high frequency energy increase in value or decrease in value these changes would likewise be indicated by circuits 44 and 45. Thus the attending operator would be warned if one of the circuits is energized and he would know at once whether the frequency were higher or lower than that desired and could make the necessary adjustments accordingly. Indicating device 40 would comprise an incandescent lamp and of the proper rating whereby an increase of energy beyond the rated wattage would cause the lamp to burn out. This rating could be proportional to the safe operational energy of crystal X. It therefore follows that the attending operator is warned by either indicating circuit 44 or 45 or by lamp 40. Circuits 44 or 45 may be associated with contact members 18 whereby the entire transmitter is closed down when the operation is abnormal or these circuits may be associated with the individual potential supply circuits to the several electrodes of the particular thermionic tube circuit with which inductance 38 is associated. Indicating systems similar to that employed in combination with thermionic tube 3 may likewise be employed in combination with thermionic tubes 1 and 2 and any additional number of high frequency circuits.

Fig. 2 of the accompanying drawings is a diagrammatic illustration showing the improvements in transmitting systems of my invention. The high frequency circuits of thermionic tubes 1, 2 and 3 are associated with suitable thermo-couples and relays 1b, 2b and 3b respectively. The high frequency circuits of thermionic tubes 4, 5, 6, 7 and 8 are associated with thermo-couples and relays 4b, 5b, 6b, 7b and 8b respectively. Pressure gauge 10 and temperature gauge 11 are associated with thermo-couple and relay 9. Thermo-couples and relays 1b, 2b, 3b, 4b, 5b, 7b, 8b and 9 are associated with indicating devices 1a, 2a, 3a, 4a, 5a, 6a, 7a, 8a and 9a, respectively. Indicating devices 1a, 2a, 3a, 4a, 5a, 6a, 7a, 8a and 9a are positioned on a suitable panel which may comprise the control cabinet and upon which may also be mounted gain controls 12—13, meter 14, control switches 15 and 16 and any other control apparatus desired. The interconnections between the transmitter proper and the indicating devices may comprise suitable lead covered wire or the like. The indicating devices may be suitably marked corresponding to the respective circuits to which they are connected.

The advantages of the improvements in transmitting systems of my invention are numerous as disclosed by the foregoing specification and accompanying drawings. I realize that many modifications of my invention are possible without departing from the spirit of my invention and it is to be understood that the embodiments of my invention are not to be limited by the foregoing specification or by the accompanying drawings but only by the scope of the appended claims.

What I claim as new and desire to secure by Letters Patent of the United States is as follows:

1. The combination in a vacuum tube transmitting system of a vacuum tube with a source of energizing current therefor, circuit connections between said source and said tube, switching means included in said circuit connections, electromagnetic means operable when energized to maintain said switching means closed, said switching means being open when said electromagnetic means is de-energized, a plurality of normally open contacts in shunt to said electromagnetic means, the arrangement being such that the closure of any of said contacts individually will short out said electromagnetic means and thereby cause its de-energization, a plurality of safety devices each individual to and adapted to close one of said contacts in response to the occurrence of an abnormal operating condition, one of said safety devices being arranged to respond to discontinuities of grid potential.

2. In a vacuum tube transmitting system, a vacuum tube comprising a plate, a filament, and a grid, a plate circuit for said tube including a source of plate current and a relay-operated contact, a relay including said contact, said contact being closed when said relay is energized and adapted to open upon de-energization of said relay, a filament supply circuit for said tube including a source of current and a second relay-operated contact, a second relay including said second contact, said second contact being closed when said second relay is energized and adapted to open upon de-energization of said second relay, said aforementioned relays having actuating windings connected in parallel in a circuit including a third contact the closure of which is essential to the actuation of said relays, a source of current included in said last mentioned circuit, a third relay including said third contact, said third relay having a winding connected in circuit with said last mentioned source of current, an indicator in series with said last mentioned winding, a plurality of safety devices each having a normally open contact in shunt to the winding of said last mentioned relay whereby upon the closure of any of said contacts said last mentioned relay is shorted out, a source of grid biasing potential connected to said grid, one of said safety devices being included in circuit with said source of grid biasing potential whereby its aforementioned contact is held open so long as normal grid biasing potential is being applied.

LOUIS A. GEBHARD.